United States Patent

Nishibori

[19]

[11] Patent Number: 5,961,054
[45] Date of Patent: Oct. 5, 1999

[54] METHOD OF RECYCLING AND GRANULATING WASTE CONTAINER MADE OF RESIN MATERIALS

[75] Inventor: Sadao Nishibori, Tokyo, Japan

[73] Assignee: Ein Engineering Co., Ltd., Tokyo, Japan

[21] Appl. No.: 08/764,013

[22] Filed: Dec. 11, 1996

[30] Foreign Application Priority Data

Dec. 13, 1995 [JP] Japan .................................. 7-324270

[51] Int. Cl.$^6$ .................................................. B02C 19/12
[52] U.S. Cl. ........................... 241/19; 241/24.18; 241/29
[58] Field of Search ............................. 241/24.18, 24.13, 241/24.14, 24.15, 24.28, DIG. 38, 29, 19, 99

[56] References Cited

U.S. PATENT DOCUMENTS

| | | |
|---|---|---|
| 4,379,525 | 4/1983 | Nowicki et al. . |
| 4,809,854 | 3/1989 | Tomaszek . |
| 5,115,987 | 5/1992 | Mithal . |
| 5,143,308 | 9/1992 | Hally et al. . |
| 5,232,607 | 8/1993 | Lundquist ............................. 241/24.18 |
| 5,297,741 | 3/1994 | Zurn et al. . |
| 5,323,971 | 6/1994 | Nishibori et al. . |
| 5,375,778 | 12/1994 | Lundquist . |
| 5,485,964 | 1/1996 | Booth et al. . |

FOREIGN PATENT DOCUMENTS

| | | |
|---|---|---|
| 0296791 | 12/1988 | European Pat. Off. . |
| 0304667 | 3/1989 | European Pat. Off. . |
| 0492043 | 7/1992 | European Pat. Off. . |
| 0 689 882 | 6/1994 | European Pat. Off. . |
| 0635308 | 1/1995 | European Pat. Off. . |
| 88978 | 8/1978 | Japan .................................. 241/24.18 |
| 61-068207 | 4/1986 | Japan . |
| 3-175008 | 7/1991 | Japan . |

*Primary Examiner*—Mark Rosenbaum
*Attorney, Agent, or Firm*—Thelen Reid & Priest LLP

[57] ABSTRACT

The thermoplastic resin waste containers are crushed into coarsely crushed pieces, an impact-grinding force and a centrifugal force are applied on the coarsely crushed pieces so that oily foreign objects be separated; i.e., the oily foreign objects are separated by the impact force and the grinding force. The difference in the centrifugal force separates the resin from the foreign object, the centrifugal force on the resin pieces being controlled by the impact-grinding force, while the centrifugal force on the oily foreign object is free from it. In the course of this process, the crushed pieces to be treated are formed into granules by the impact-grinding force, and the granulated granules are reused as a resin material. Foreign objects other than oils can be separated and removed more easily than oils.

8 Claims, 10 Drawing Sheets

METHOD OF RECYCLING AND GRANULATING WASTE CONTAINER MADE OF RESIN MATERIALS

BACKGROUND OF THE INVENTION

1. Field of the Invention

The present invention relates to a method of recycling and granulating waste container made of thermoplastic resin materials.

In more detail, this invention relates to treating waste containers made of thermoplastic resin materials (hereinafter also called "resinous containers"), which are used in an enormous number edible oils such as tem-pura (deep-fried fish and vegetables) oil, sesame oil, and salad oil; for viscous fluids such as Worcester sauce, mirin (sweet sake as seasoning) and dressings (hereinafter called "containers for viscous fluids"); for various types products such as beverages, shampoo, detergents, eye lotion, vinegar, soy sauce, sake, and beer; wherein metal parts are removed from the waste resinous containers; the resin part is shredded in a broader sense crushed into small pieces; foreign objects including residual contents such as oils, viscous fluids, beverages and other products for daily use as well as foreign matters such as rain water, dew, mud, soil, sand, and dirt clung adhering small pieces to the coarsely crushed pieces are separated and removed; each type of reusable resin materials is separated, recycled and granulated; thus, this invention relates to a method for recycling and granulating reusable resin materials. Also, the recycled granules are further granulated into more uniform grain sizes, which are directly molded into products such as fibers and other forms of products, or into pellets; thus, the present invention relates to the method for implementing all of these processes.

Resinous containers mentioned above include bottles made of resin materials such as polyester (polyethylene terephthalate or PET, hereinafter called "PET bottles"), polyethylene (hereinafter called "PE bottles"), and poly (vinyl chloride) or PVC (hereinafter called "PVC bottles").

2. Description of the Prior Art

The resinous containers mentioned above (hereinafter simply called "containers") such as PET bottles are used to contain oily products, viscous fluids, beverages, and other types of products for daily use. Recent development of stretch-blowing technique made it possible to produce less expensive and high-performance PET bottles, which has resulted in an enormous number of discarded waste containers. The total weight of waste PET bottles is said to be 10,000 tons per month in Japan; consequently, recycling of waste PET bottles has become a social demand.

Such waste stretch-blown containers (hereinafter simply called "waste containers") made of poly(vinyl chloride) (PVC), polyester (PET), and polyethylene (PE) are discarded after consumption of the contained products, the discarded bottles are contaminated with foreign matters such as mud, soil, sand, and dirt. Conventionally, these containers have been collected, washed with water to remove the foreign objects, dried, crushed, and recycled into fibers or blow-molded piles for the replacement of wood.

These containers are resistant to water, weather, and corrosion; also PVC, in particular, generates a large amount of harmful gas and smoke when incinerated to disrupt the environment. Further, the melted resin materials stick to the furnace wall to spoil the furnace. To solve these problems, those waste containers are being used for a landfill, wherein the waste resin remains uncorroded over an extended period, they appear to present another factor for environmental disruption.

On the other hand, such resin materials will yearly be exhausted due to resource depletion, and it is now demanded and recognized that the post-reuse resin materials must be recycled without disposal.

Conventionally, the waste containers have been washed with water for removal of the foreign objects and processed for recycling. The process includes washing and drying, requiring a large amount of water and a large equipment.

In particular, oily materials such as tem-pura oil, sesame oil, and salad oil are harder to separate from the waste container, compared with other materials; e.g., washing with water could hardly remove these foreign objects and special detergents had to be used. Washing harmful materials such as surfactants with water contaminated rivers and had to be neutralized before draining, adding additional high costs of facility and operation.

Viscous fluids such as Worcester sauce, dressing, and mirin are easier to separate than the ones above mentioned oily materials, while the viscosity sometimes has caused troubles in washing off these materials by water.

Other products such as beverages, shampoo, detergents, eye lotion, vinegar, soy sauce, sake, and beer than the above mentioned oily or viscosity ones may be purified by water, while some of these products contain harmful ingredients such as a detergent which must be neutralized before draining and added high costs to facility and operation. Most of the waste containers have been discarded without recycled, because of these problems caused by the difficulties in washing, added high costs in facility and operation, and waste of a large amount of water and energy resources.

The present invention is to solve these problems providing a method for separating and removing foreign objects such as the residual content, mud, soil, sand, and dirt from the containers to be treated, efficiently recycling and granulating the resin materials into a specific range of size, in a relatively simple manner.

SUMMARY OF THE INVENTION

The present invention is to solve theses problems, providing a method to separate foreign objects from waste resinous containers and to recycle resin materials, comprising at least the following steps:

a process to shred waste containers with printed plastic films into small pieces to be treated 82; a process to separate and remove the film by a sucking force of wind;

a process to apply an impact-grinding force to separate foreign objects from the resin material, granulate the resin material as recovered resin materials; and further comprising:

a process to crush the container into the coarsely crushed pieces 81 before the shredding process into a plurality of crushed pieces 81; and further including following process:

a process to apply an impact-grinding force and a centrifugal force to the coarsely crushed pieces 81 to separate the foreign object from the resin material; and comprising process including following steps in addition to the above process:

a process to shred the coarsely crushed pieces 81 into small pieces to be treated 82; and further comprising:

an object is container made of thermoplastic resin materials coupled with a skirt underneath; by applying an impact-grinding force to said shredded small pieces to be treated composed of a main body and a skirt to separate foreign objects and to clean and dry; further by applying said impact-grinding force to further pulverize for granulation said skirt to collect the resin material as recovered resin materials, and to separate and classify the granulated resin materials of said main body; and further comprising:

said object is container made of thermoplastic resin materials coupled with a flanged screw portion;

by applying an impact-grinding force on shredded pieces of said main body and screw portion to separate foreign objects, to granulate, clean and dry said resin materials; the resin material of said flanged screw portion is separated by specific-gravity selection in a water; and the resin materials of said main body and said flanged screw portion are recovered separately as recovered resin material.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENT

Waste Containers to be Objected

In the mode of embodying the present invention, waste PE bottle used for oily products such as tem-pura oil, sesame oil, and salad oil was taken up, which products are the most difficult to separate and granulate; and as long as the method of this invention can separate and remove these oily products to recycle and granulate the resin material, other containers used for other products than the foregoing are easier to handle. Thus, all the waste PE bottles for viscous liquid products such as Worcester sauce, dressing, and mirin as well as for various products such as beverages, shampoo, detergents, eye lotion, vinegar, soy sauce, and beer can also be the object of waste containers.

The resin materials of the object waste containers include polyethylene (PE), polyester (PET), and poly(vinyl chloride) (rigid PVC). A residual content as well as foreign matters such as mud, soil, sand, and dirt are remaining on the surfaces of these bottles.

The bottles have various shapes and structures, and are made of various types of resin materials. Types of the waste containers include:

(1) bottles with or without a skirt underneath
(2) bottles with a cap made of metal or plastic on top
(3) bottles with a screw portion to tighten the cap, the main body, and a skirt, which are made of either different resin materials or the same resin.
(4) resin materials is transparent or colored In the mode of embodying the present invention most efficiently, it is preferable to use the optimized processing conditions and/or to select the optimum combination of the processes according to the types of residual content and resin materials used in various parts of the bottle.

Figure 1:
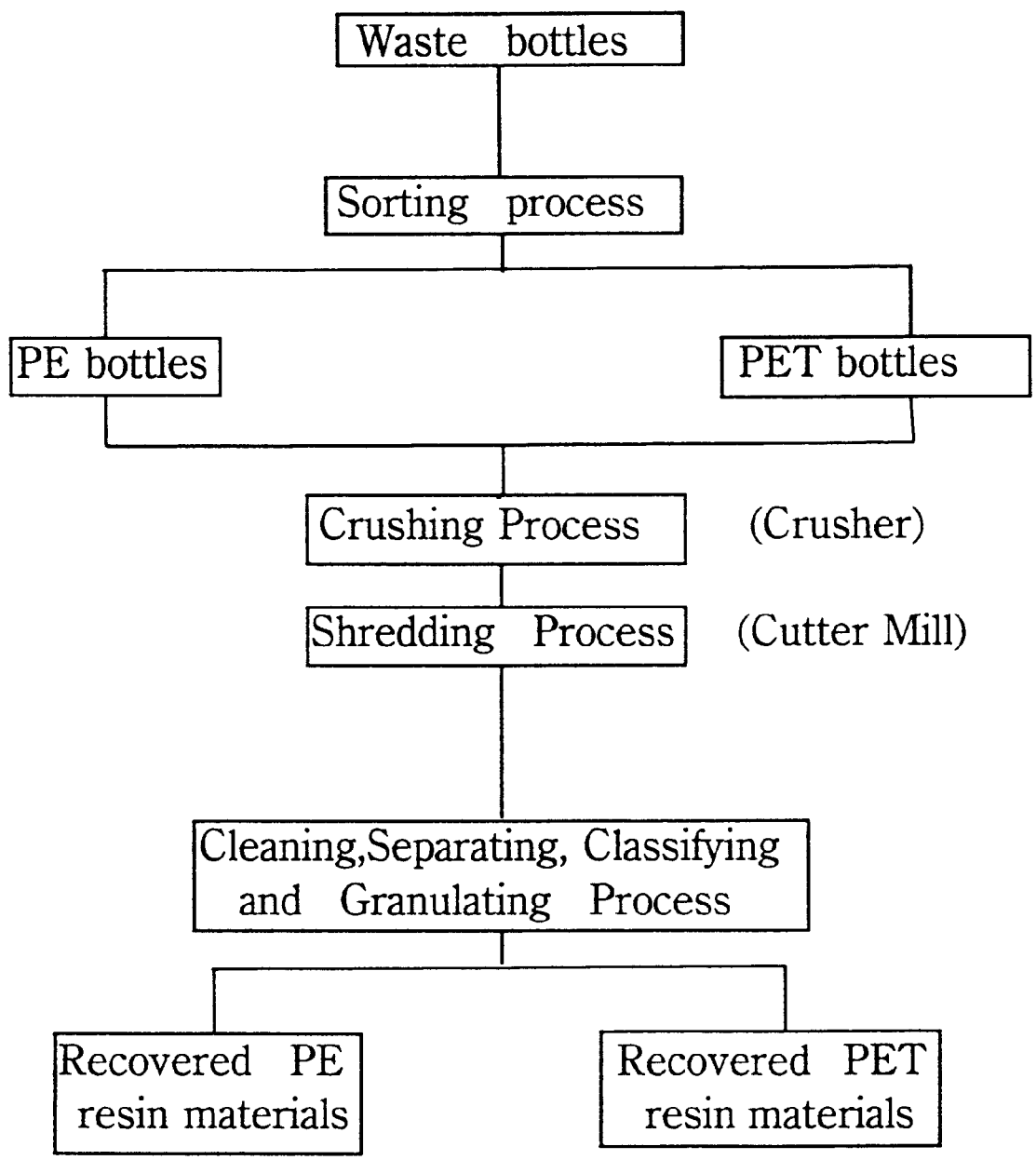
FIG. 1 is a systematic illustration of embodiment 1, showing a fundamental principle of the process of this invention for recycling and granulating the resin material. The object waste containers processed by the method of this embodiment basically include the container without a skirt or other accessories, the container with a skirt and other accessories such as a cap and a screw portion, and without a label having printed layer such as trademarks etc., however, made of the same type of resin as the main body of the container.

Basically, the object waste bottle of FIG. 1 is a bottle without a skirt nor a printed label showing trademarks and etc.; and a bottle with a skirt and without a printed label wherein the cap, the screw portion, the main body, and the skirt are made of the same resin material. The cap is removed from the bottle and is discarded if it is made of metal, most of the residual content is discarded, and the cap, the screw portion, the main body, and the skirt are processed together through sorting, crushing, shredding, cleaning, separating, classifying, and granulating processes if all these parts are made of the same resin material.

As an embodiment, a recycling method and processes for recycling PE from PE bottle are explained below referring to FIG. 1; wherein the residual content is salad oil.

Sorting Process

Bottles are sorted according to the resin types, PE, PET, or PVC in this process (FIG. 1 shows PE and PET only, but the object resin materials are not confined to these), and also to color/transparency.

Colored containers should preferably be further classified into different colors.

Crushing Process

Figure 3:
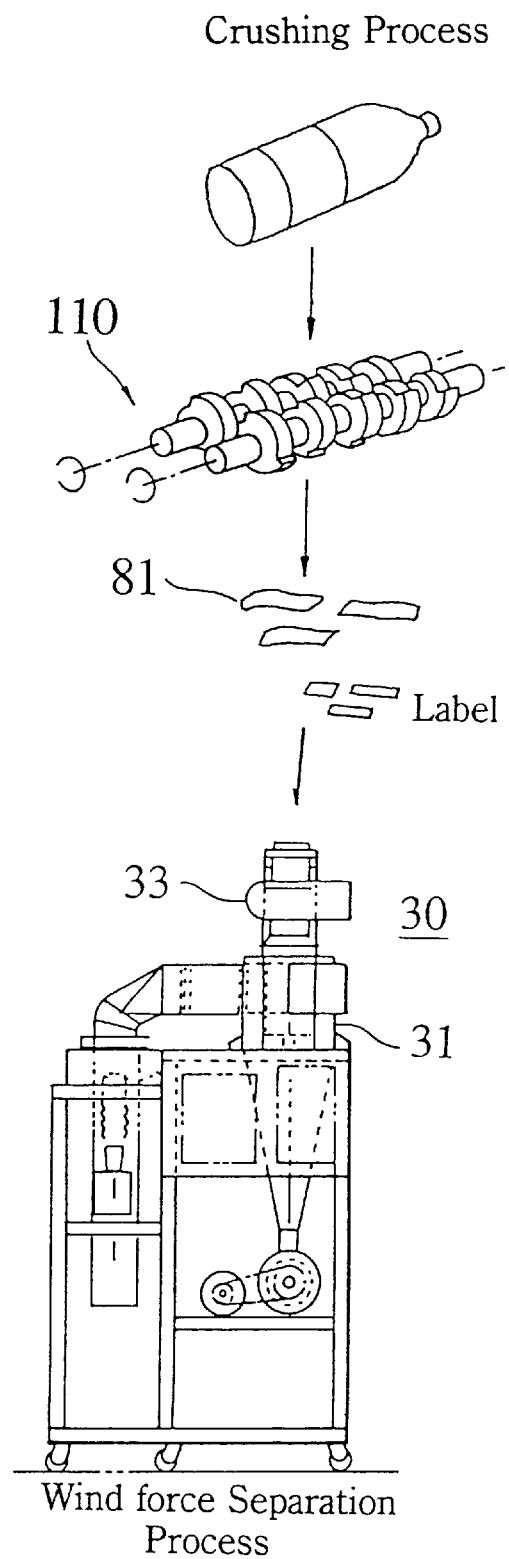
FIG. 3 is a conceptual and schematic representation of each process of crushing and wind-force separation.

The PE bottles classified as above Sorting process are shredded or crushed in a broader sense into coarsely crushed pieces 81 using a crushing means 110 shown in FIG. 3. A preferable size of the coarsely crushed pieces obtained is, for example, 15 mm×50 mm.

The crushing means is to crush the object to be crushed into pieces of a suitable size, and is called a "crusher" in this embodiment FIG. 3 shows an embodiment of this "crusher".

Crusher 110 has an upper feeding inlet port to feed the material, two parallel counter-rotating axis in the main body of the crusher, a plurality of rotary blades at a specified interval on each axis, three fixed blades intermeshing with the rotary blades at the circumferential loci and inclined by the same angle. These fixed and rotary blades shred the bottle into coarsely crushed pieces of a suitable size.

The waste bottle is fed from the inlet port, the rotary blades push the waste bottle inward by the intermeshing blades which shred the bottle continuously by a shearing force, a compressing force generated between the the intermeshing blades crushes and shreds the bottle into coarsely crushed pieces 81. Residual salad oil is still stuck to the surface of the coarsely crushed pieces 81.

The crushing means used in this invention is not confined to those mentioned above; e.g., other crushing means such as Gynax-Crusher manufactured by Horai Ltd., Roll-Crusher by Nara Machine Works, Ltd., as well as other crushing means such as mono-cutters, shredders, and other types of crusher can be used.

Figure 4:
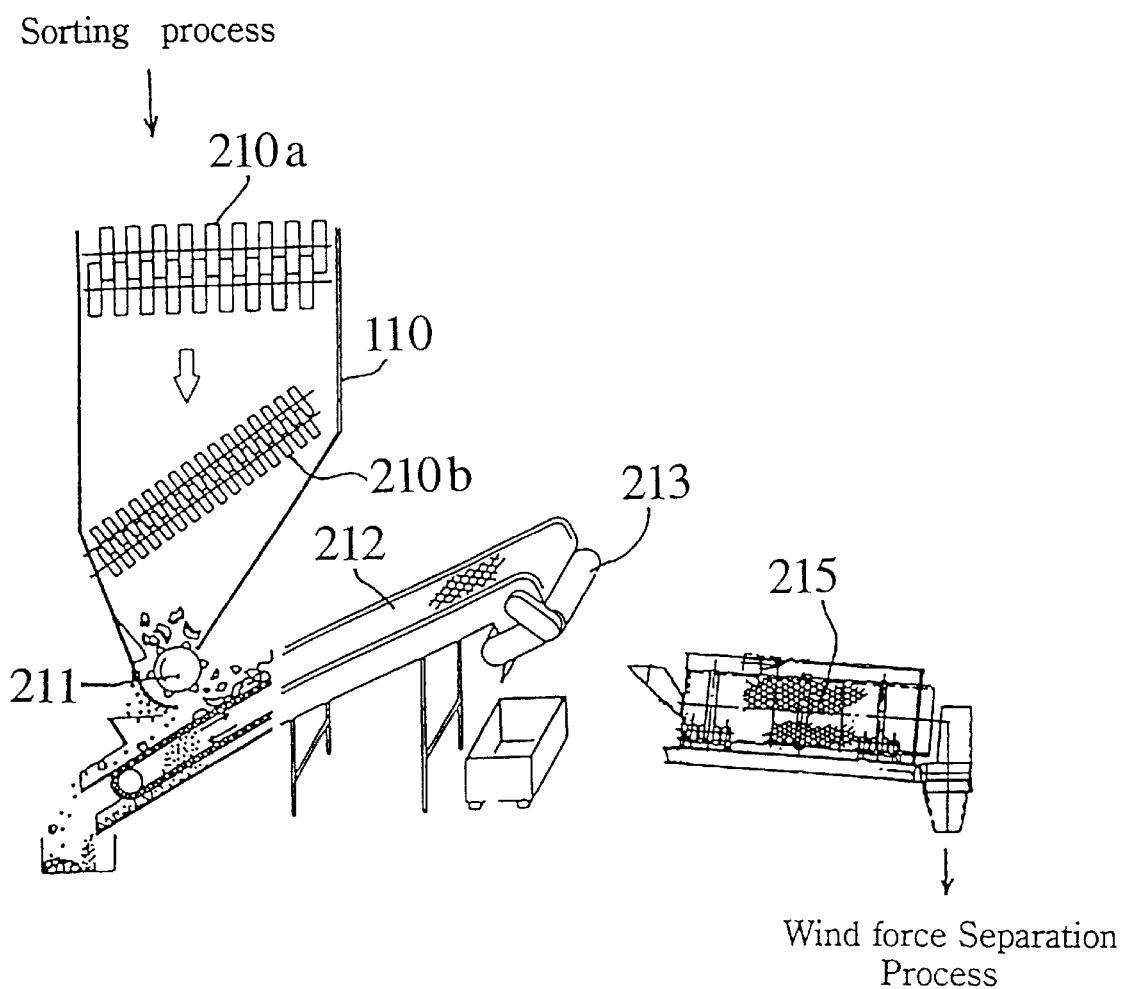
FIG. 4 is a schematic representation of a vertical sectional view of a device used in other embodiments of the crushing process.

As shown in FIG. 4, the crushing means has two crushers 110 placed at two stages, upper and lower, to crush the object twice increasing the capacity greatly and decreasing the processing time. More details are explained in the embodiment associated with FIG. 2.

Shredding Process

This process can be omitted when waste container to be objected used only for an oily product, a viscous fluid, and other type of liquid and may be applied if required. Coarsely crushed pieces 81 produced in the crushing process are further shredded smaller into small pieces to be treated 82 using a shredder shown in FIGS. 5 and 6. Small pieces to be treated 82 may be, for example, long squares of approximately 2 mm×15 mm, squares of approximately 10 mm×10 mm, or pieces with no specific shape with a side of approximately 10 mm or smaller. At this point, residual salad oil is still on the surface of the small pieces to be treated 82 as well as the above mentioned crushing process.

The shredding means is to shred the coarsely crushed pieces 81 into small pieces to be treated 82, and is conveniently called a "cutter-mill" in this embodiment. The cutter-mill 120 has an inlet port to feed the coarsely crushed pieces 81, a cutter-supporter with rotary blades on its circumference, and a fixed blade in the main body with a suitable clearance from the rotary blades. More details of cutter-mill 120 are explained in the embodiment associated with FIG. 2.

The clearance used in this embodiment is 0.2 through 0.3 mm. The coarsely crushed pieces 81 which are crushed by the above mentioned crusher 110 into a size of 15 mm×50 mm are fed to the inlet port of cutter-mill 120 and shredded between the rotary and the fixed blades and almost all pieces are granulated and size-regulated into a size of approximately 2 mm×15 mm with unspecified shapes and areas, which can pass through the screen. Then, the small pieces to be treated 82 are discharged from the outlet port to transfer to the next process.

Cleaning/ Drying/Classification/Granulation Process

An impact-grinding force and a centrifugal force are applied to the coarsely crushed pieces 81 crushed by the above crushing means or the small pieces to be treated 82 shredded in the Shredding process as required. According to the present mode of embodiment in shredding the crushed piece 81 into the small pieces to be treated 82, a grinding force and an impact force, mainly the latter impact force separates a part of the residual salad oil or other foreign objects on the surface of the coarsely crushed pieces 81, and further a centrifugal force readily separates the residual salad oil from the coarsely crushed pieces 81. The impact force exerted onto the coarsely crushed pieces 81 accelerates the separation of the residual salad oil, while the impact force controls the centrifugal force on the same resin piece 81 to a certain extent. On the other hand, the centrifugal force on the residual salad oil are hardly controlled and thrown away the salad oil more rapidly outward and then, easy separation and cleaning are facilitated. Further, the friction heat generated by the impact force increases the temperature of the residual salad oil to further accelerates the separation. In case a combination of an impact force and a grinding force crushes the coarsely crushed pieces 81, and also accelerates separation of the residual salad oil and a centrifugal force pushes out the residual salad oil from the coarsely crushed pieces 81. The coarsely crushed pieces 81 of PE bottles are centrifuged at 1600 through 1800 rpm for about 10 through 12 minutes. The coarsely crushed pieces 81 are crushed by a combination of an impact force and a grinding force into small spheres having a diameter of about 1 through 4 mm, which are further granulated and size-regulated, and polished into uniform grains. PE resin naturally forms spheres when an impact-grinding force is applied to PE bottle. Foreign objects other than oily products are separated from PE bottle coarsely crushed pieces by applying a centrifugal force at a revolution speed of 800 through 900 rpm for 5 through 6 minutes, and the pieces are granulated and size-regulated, and the grains are polished into a uniform size. Residual oily products were insufficiently separated by a centrifugation for 5 through 6 minutes, while they could be efficiently separated by a prolonged centrifugation.

Incidentally, a batch size depended on the revolution speed, presence of air, and temperature. According to the present embodiment, a 60 kg batch was processed for 10 minutes, and the final level of the residual salad oil was decreased to 0.1 percent by weight after granulation, polishing and recovered. This level is sufficiently low and without a problem because, usually, an oily material of that level is added to PE resin together with fillers when the resin is actually processed.

When an impact-grinding force and a centrifugal force is applied to the coarsely crushed pieces 81 and small pieces to be treated 82, a compressed air of approximately 5 kg/cm$^2$ should preferably be blasted onto these coarsely crushed pieces to facilitate separation of the residual oily product. More preferably, the compressed air should be preheated to increase efficiently.

The means for cleaning/separation/classification/granulation separates and removes the foreign objects from the coarsely crushed pieces 81 and small pieces to be treated 82; and crushes, cleans, and granulates the resin material from the main body of the waste container; and polishes to recycle the resin material. The means is conveniently called a "separator" in this embodiment.

Figure 7:
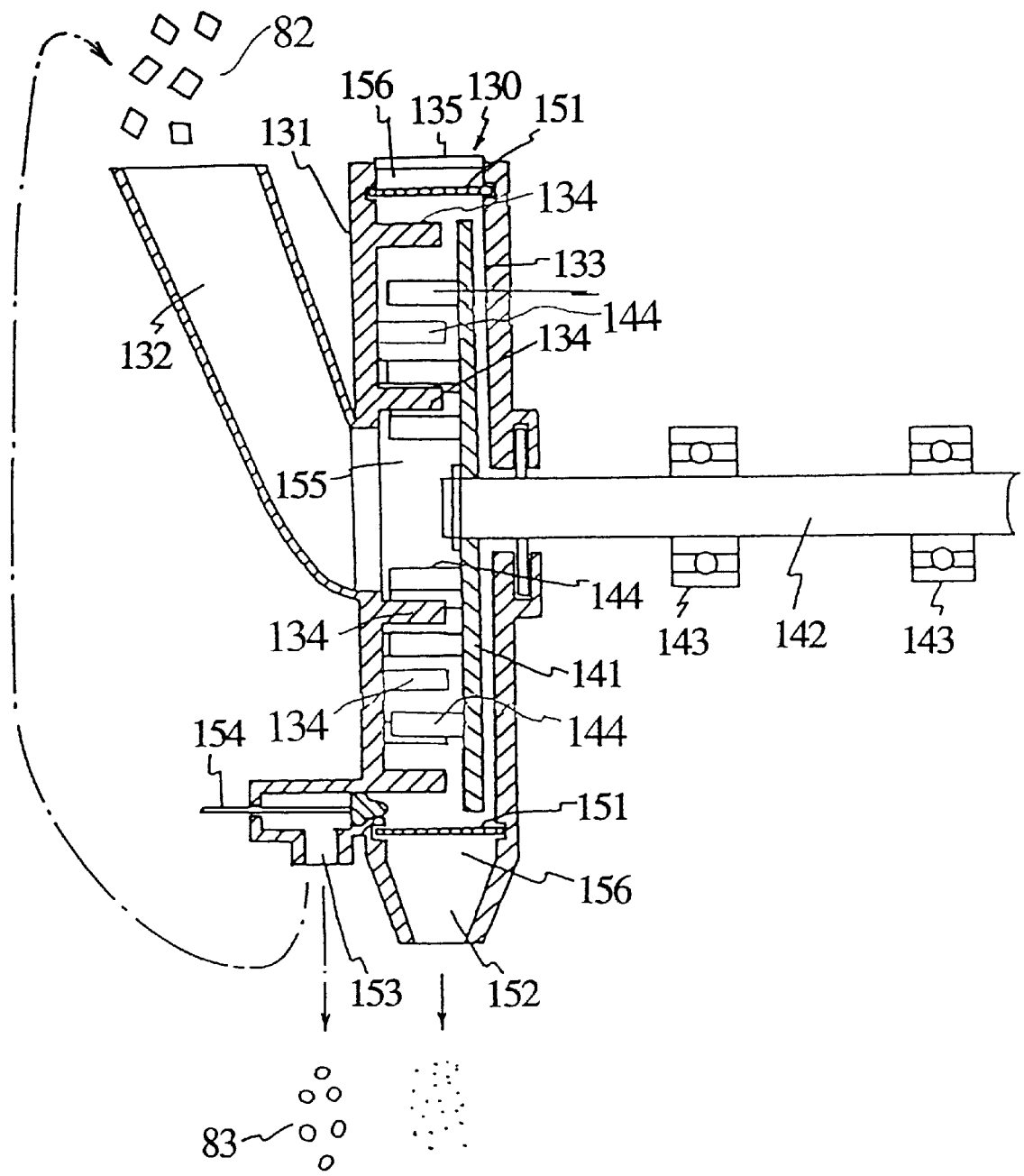
FIG. 7 is an illustrated vertical section of a polishing/granulating device used in the same embodiment.
Figure 8:
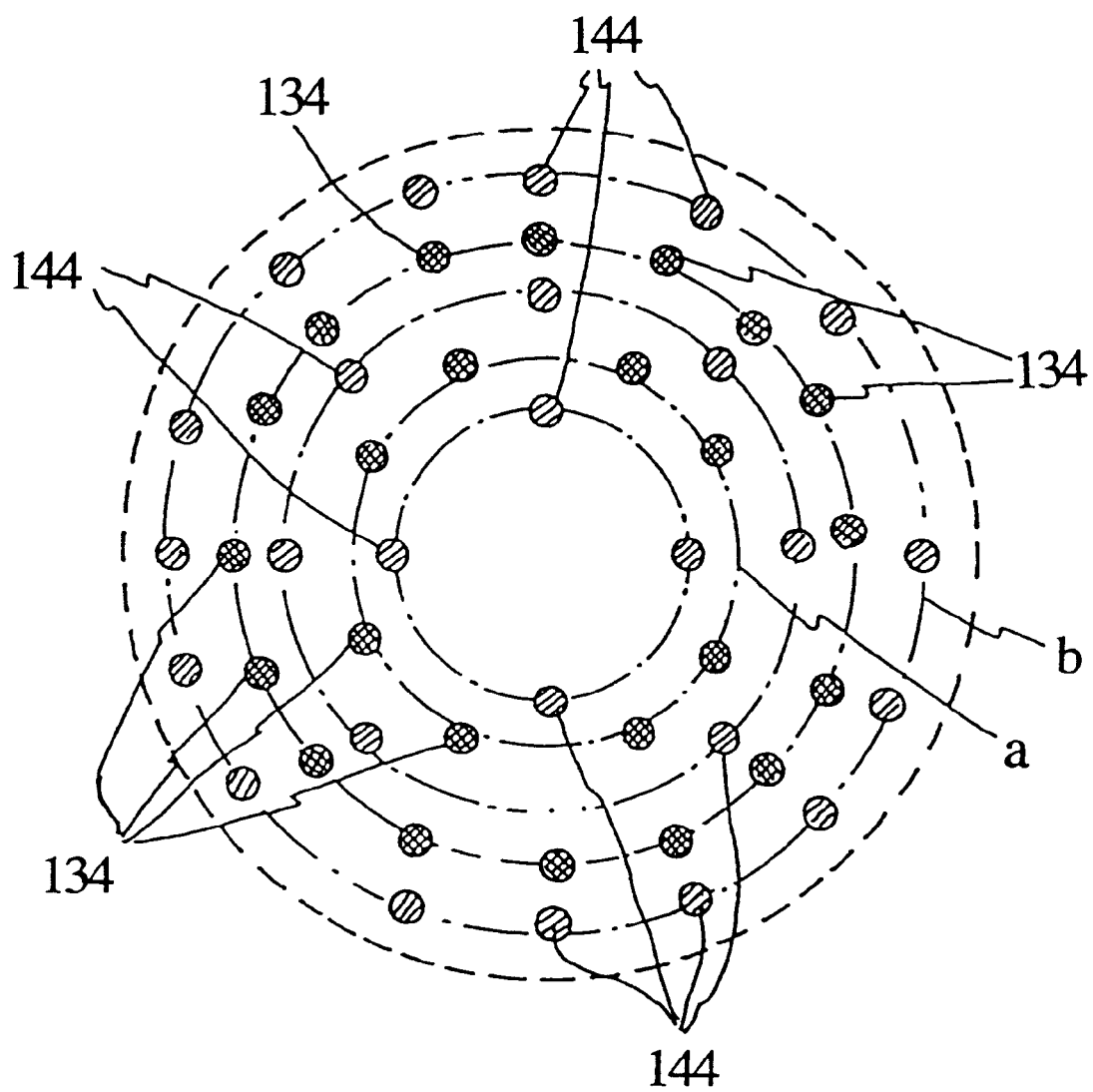
FIG. 8 is a front view to explain the polishing/granulating/size-regulation functions shown in FIG. 7.

Referring to FIGS. 7 and 8, separator 130 has an inlet port 132 to feed the coarsely crushed pieces 81 and small pieces to be treated 82 (hereinafter explained as the small pieces to be treated 82) at the center of a fixed disk 131; the fixed end plate 133 faces the fixed disk 131 with a processing space 155 between them; and the circumferential side plate 135 fixes the circumferential fringes of the fixed end plates 133 to the fixed disk 131. The processing space 155 has a movable disk 141 driven by a horizontal rotary axis 142, and the horizontal rotary axes 142 are supported by the bearings 143,143. The horizontal rotary axes 142 are driven by a rotating means which are not shown.

The fixed pins 134 are placed in a row on concentric loci a (FIG. 8, relative to the mobile disk 141) on the fixed disk 131; the mobile pins 144 are placed alternately on different loci b from the loci of the fixed pins on the mobile disk 141; and the fixed pins 134 and the mobile pins 144 are positioned to generate an impact-grinding force between the two types of pins, which forces are used to crush and polish the small pieces to be treated. A screen 151 with punched holes of a specified size is put on the circumferential side of the mobile disk 141, the discharge space 156 separates the screen from the circumferential side plate 135, and the discharge port 152 is positioned under the discharge space 156. A blower 157 is positioned at the outlet port 152 as shown in FIG. 7. The mesh size of the screen 151 in this embodiment is 1 mm in diameter, while a screen size of not larger than 1 mm is normally preferable, and 0.7 mm is the most preferable.

An outlet port 153 is positioned in the lower part of the screen 151, and a plug valve 154 is placed at the outlet port 153 to control the opening. A communicating blower 158 is placed in the outlet port 153 as shown in FIG. 1 to suck the air in the separator 130, the outlet port 153 is connected to the inlet port 132 through the blower 158.

With an increased clearance between the fixed pins 134 and the mobile pins 144, the grinding force on the small pieces to be treated 82 is decreased, while an decreased clearance increases the grinding force. A liquid foreign object on the small pieces to be treated 82 requires an adjustment of clearance to decrease the grinding force and to increase the impact. The clearance should also be adjusted according to the grain size of the recovered resin materials to be polished and size-regulated.

Figure 5:
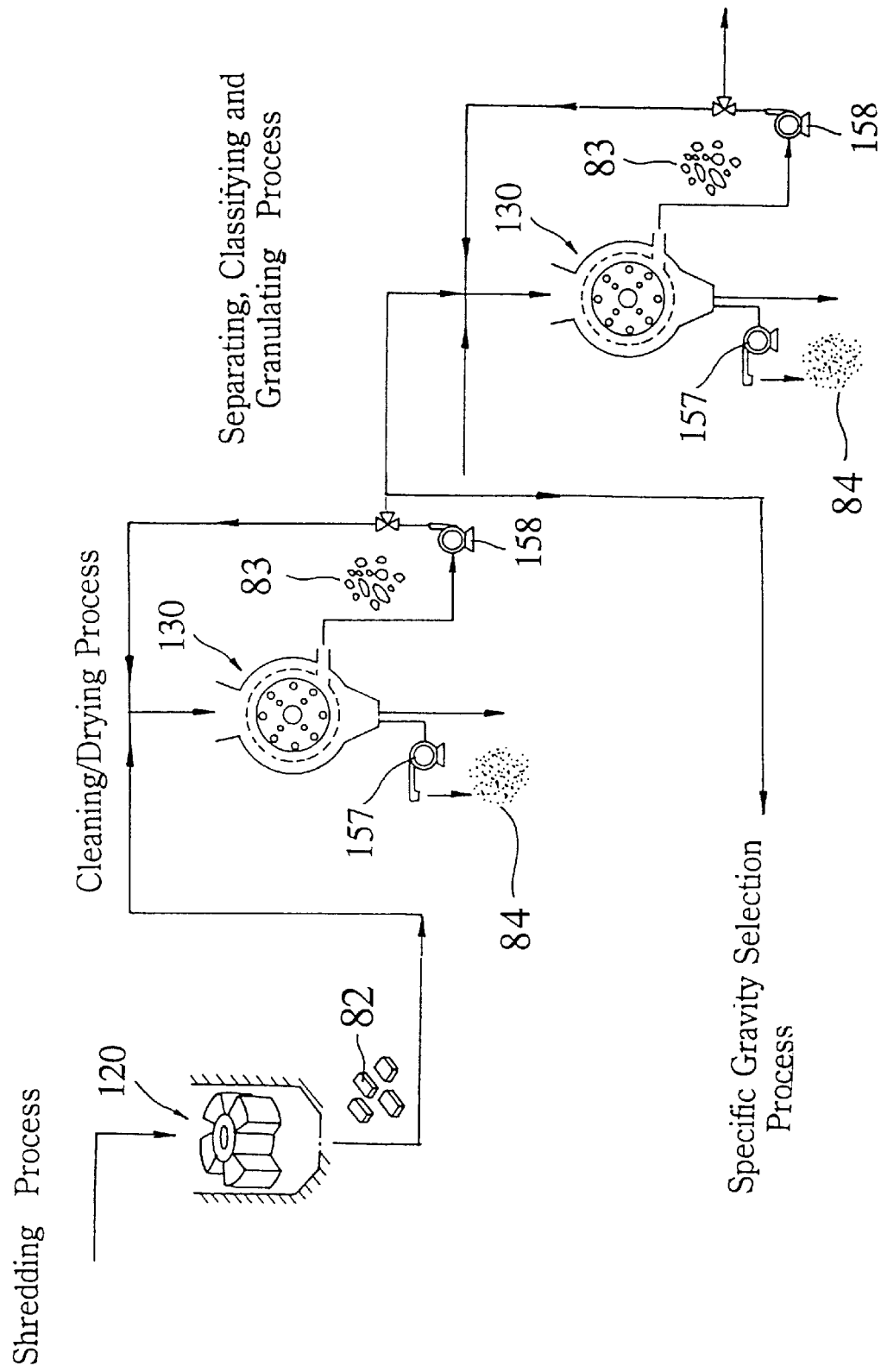
FIG. 5 is an illustrated systematic processes for shredding, cleaning, drying, separation, classification, and granulation.
Figure 6:
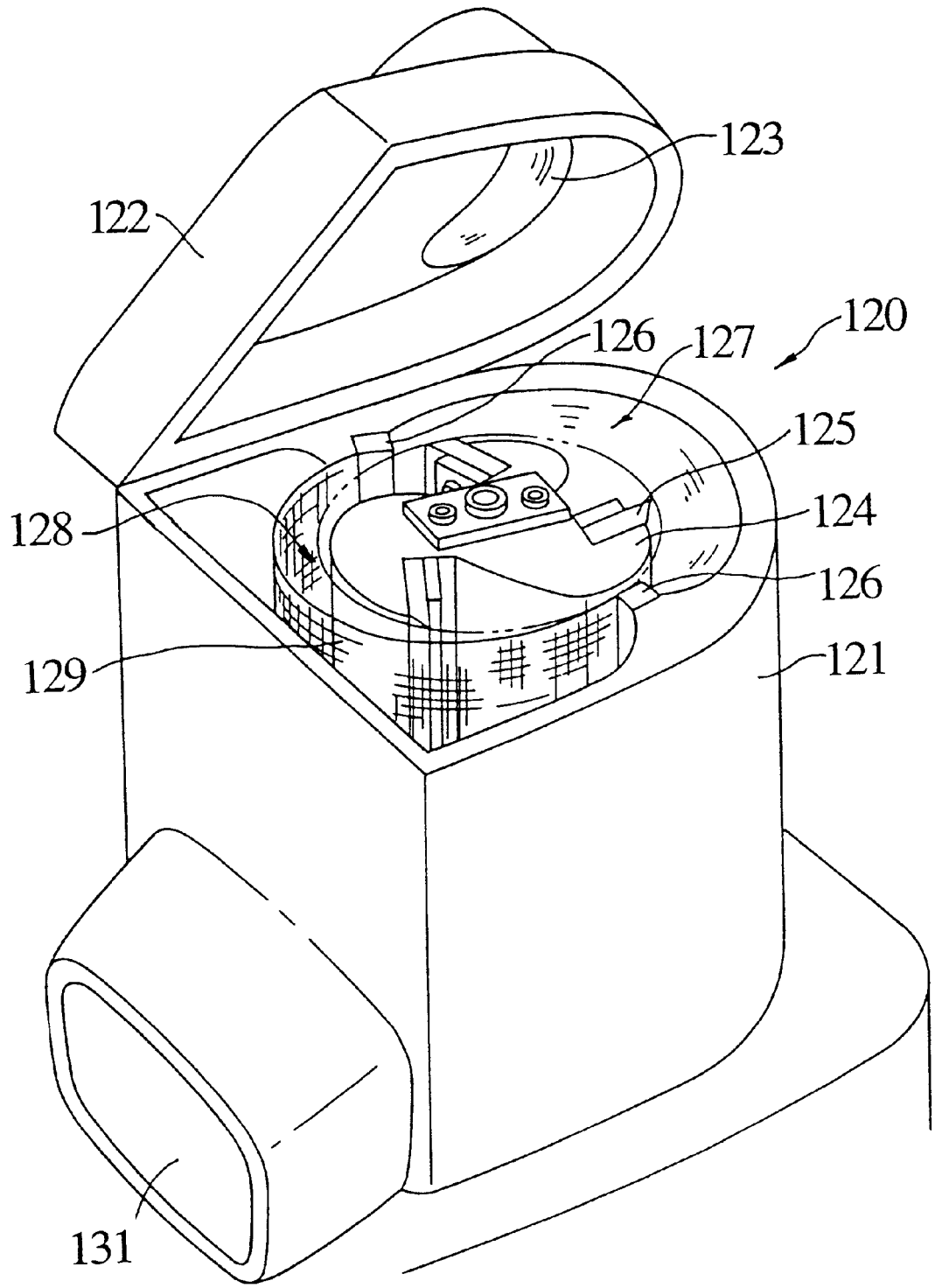
FIG. 6 is an entire diagonal view of a cutter mill (shredder) used in the shredding process of this invention.

Referring to the separator 130, the mobile disk 141 is rotated with the horizontal rotary axis 142 by means of an unillustrated driving means, and the small pieces to be treated 82 fed from the inlet port 132 are crushed, polished, and granulated and size-regulated in a center portion of a processing area 155; and approach the circumferential side by the impact-grinding force generated between the fixed pins 134 and the mobile pins 144. During this process, the impact applied on the small pieces to be treated 82 accelerates the separation of the residual salad oil, which is pushed outside by the centrifugal force, the impact force controlling the centrifugal force on small pieces to be treated only. The friction heat generated by the impact-grinding force increases the temperature of the salad oil on the surface of the small pieces to be treated 82, which further facilitates the separation. PE of PE bottle naturally forms spheres as its property, which are polished into a granules having diameters of about 1 through 4 mm. The separated salad oil and a part of the small pieces to be treated 82 pass the screen 151 pushed by the centrifugal force generated by the mobile pins 144, are classified in the discharge space 156, and are sucked and discharged through the outlet port 152 by the blower 157 (FIG. 5).

On the other hand, the granulated and size-regulated resin material 83 remains on the screen 151 as larger spheres. Some salad oil still remains on the larger granulated resin material 83, and some salad oil separated from the small pieces to be treated 82 sticks to the granulated resin material 83 when the latter passes through the screen. With the plug valve 154 open, the discharge port 153 and the inlet port 132 are communicated through the blower 158 (FIG. 5); the granulated resin material 83 taken out of the outlet port 153 is returned to the inlet port 132; and the recovered granulated resin material 83 is crushed, polished, and granulated and size-regulated again. The salad oil 84 remaining on the granulated resin material 83 are separated by a centrifugal force, the recrushed granulated resin materials passes through the screen 151, and are discharged through the discharge port 152. Although the granulated resin material 83 are returned to the inlet port, the most part thereof remains on the screen 151 without being crushed into smaller ones to pass the screen. The cleaning/separating/classifying/granulation processes can be repeated until the salad oil on small pieces to be treated 82 in the batch is completely separated and discharged through the discharge port.

The recycled PE resin in the form of granulated and size-regulated grains are taken out through the outlet port 153 by opening the plug valve 154.

In place of or in addition to the blower 158, compressed air can be introduced into the processing space 155 of the separator 130, and the large granulated resin materials 83, which remain on the screen 151, can be returned to the inlet port through a hole on the fixed end plate 133 and the pipe.

Figure 9:
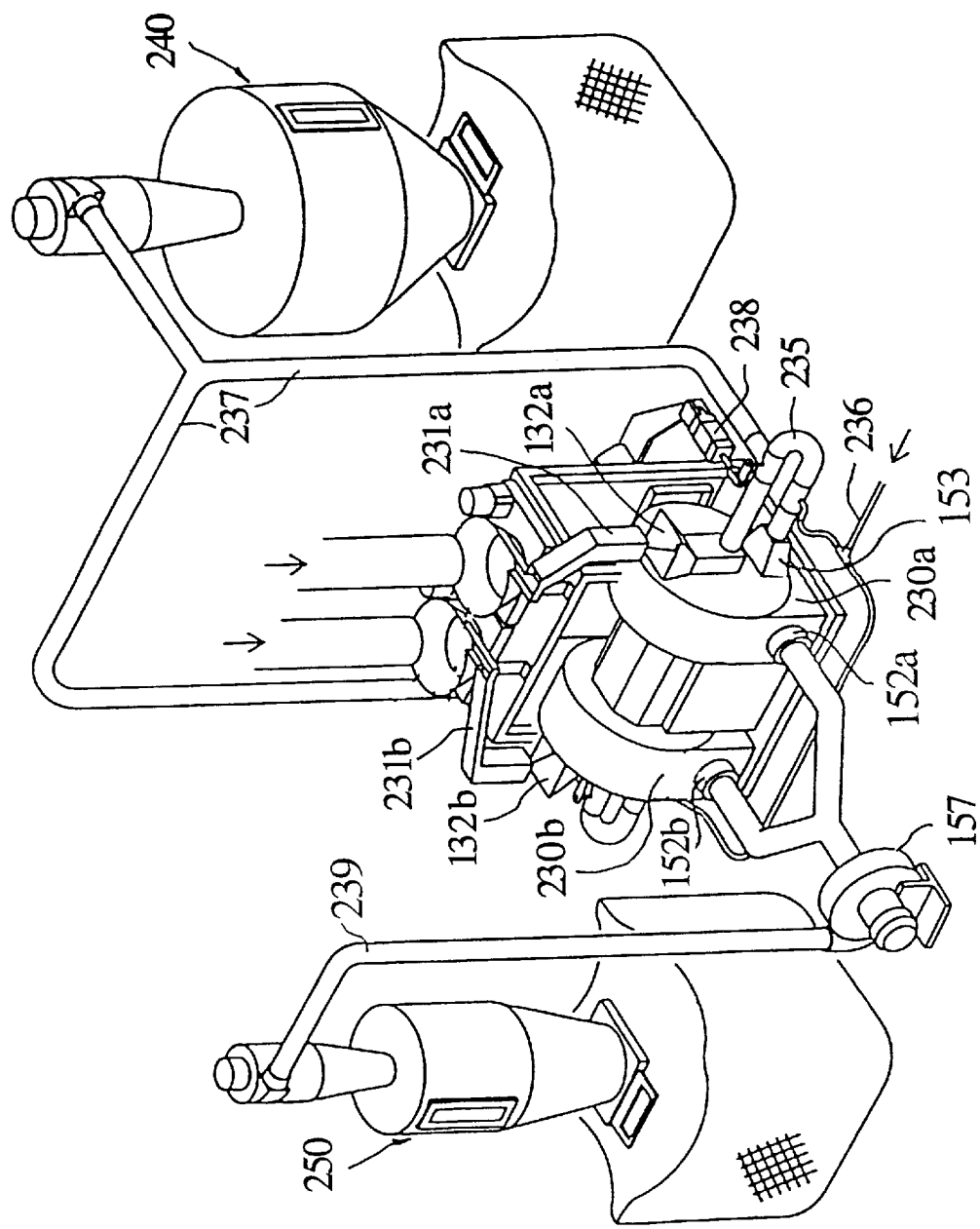
FIG. 9 is a diagonal view outlining a separator used in cleaning separation/granulation/size-regulation of this invention.

The recycled resin material can be raked out from the outlet port, or can be automatically collected in the collecting tank 240 as shown in FIG. 9. The latter case is explained in the next embodiment.

Referring to FIG. 9, two separators 230*a* and 230*b* are placed at symmetrical positions so that they can be rotated using the same driving means; each separator 230*a* or 230*b* is to feed the processed coarsely crushed pieces 81 (or 82) to the inlet port 132*a* or 132*b* through the feeding tube 231*a* or 231*b*. Since the two separators 230*a* and 230*b* have the same structure, the function is explained using the separator 230*a* only. Separator 230*a* connects the outlet port 153 for the resin material with the feeding port 132 through the communicating pipe 235, and connects the piping 236 from the unillustrated compression air supply source with the outlet port side of the communicating pipe 235. A flow-regulating plate is placed at the communicating portion of the piping 236 to make the compressed air flow mainly toward the inlet port 132. The communicating pipe 235 is branched on the side of inlet ports 132*a* and 132*b* and a branch pipe 237 is attached to communicate with the recovery tank 240; and a three-way solenoid valve 238 is placed to switch the rout at pre-determined time using a timer at the branch point of the branch pipe. The discharge port 152*a* or 152*b* of each separator 230*a* or 230*b* communicates with the collecting tank 250 through the discharge pipe 239; the foreign object passing through the screen 151 (FIG. 7) can be sucked by the blower 157 placed in the discharge pipe 239 to discharge to the collecting tank 250.

The separators 230*a* and 230*b* are activated by a driving means; the downstream side of the communicating pipe 235 is opened by the three-way solenoid valve 238 and the branch pipe side is closed; compressed air is fed from the piping 236 to the communicating pipe 235; and thus a circulating air stream generates pressure in the communicating pipe 235, the inlet port 132, the processing space 155, the outlet port 153, and again in the communicating pipe 235 in succession. When a batch of the coarsely crushed pieces 81 (or small pieces to be treated 82) is fed to the inlet port 132*a* and 132*b* through the feed pipe 231*a* and 231*b*, the salad oil separated from the coarsely crushed pieces 81 (or small pieces to be treated 82) in the separator 230*a* and 230*b* passes through the screen 151 by the blower 157 and is discharged to the collecting tank 250. On the other hand, the granulated resin materials 83 remaining on the screen 151 in a form of granules are sucked to the communicating pipe 235 by a circulating air stream, sent to the processing space 155 again, processed in the separators 230*a* and 230*b*; and the cycle is repeated until most of the residual salad oil in the batch is separated and removed as required. After the processes, the downstream side of the communicating pipe 235 is closed by the solenoid valve and the branch pipe side is opened, and thus the granulated resin materials 83 on the screen 151 is collected to the recovery tank 240 through the communicating pipe 235 and the branch pipe 237.

In place of the three-way solenoid valve 238, regular solenoid valves can be placed in the branch pipe 237 and on the the downstream side of the communicating pipe 235 to open and close alternately.

The explanation above is for an embodiment using two separators, while the process can also be designed in the same way using a single separator.

As an example, 6 kg of PE small pieces to be treated 82 is fed to separator 130 having the structure as mentioned above, and the mobile disk 141 is rotated at 1750 rpm with an A.C. frequency of 60 Hz. Then, the small pieces to be treated 82 were processed into granulated resin materials 83 in a form of spherical granules of around 1 through 2 mm in diameter, polished, and granulated and size-regulated. Residual salad oil in this granulated and size-regulated PE resin material was no more than 0.1 percent by weight.

When the containers used for oils and viscous fluids are processed, the rotating speed of the mobile disk 141 should be decreased not to polish and size-regulate the PE resin excessively into a fine powder. The rotating speed of the mobile disk 141 should be kept as low as possible within a range that can keep the granule size of PE larger than the mesh of the screen 151, since the oil and the viscous fluid are ejected outward faster than the small pieces to be treated 82 even with a decreased speed of the mobile disk 141.

As another waste containers to be objected, an embodiment for recovering PET resin materials from polyester (PET) waste bottles with some residual salad oil is explained according to FIG. 1. Explanation on the processes common to PE are omitted for simplification.

Metal caps are removed from the waste bottles, the residual product in the bottles was discarded; and the waste bottles are subjected to sorting, crushing, shredding, and cleaning/separation/classification/granulation.

Crushing Process

Figure 2:
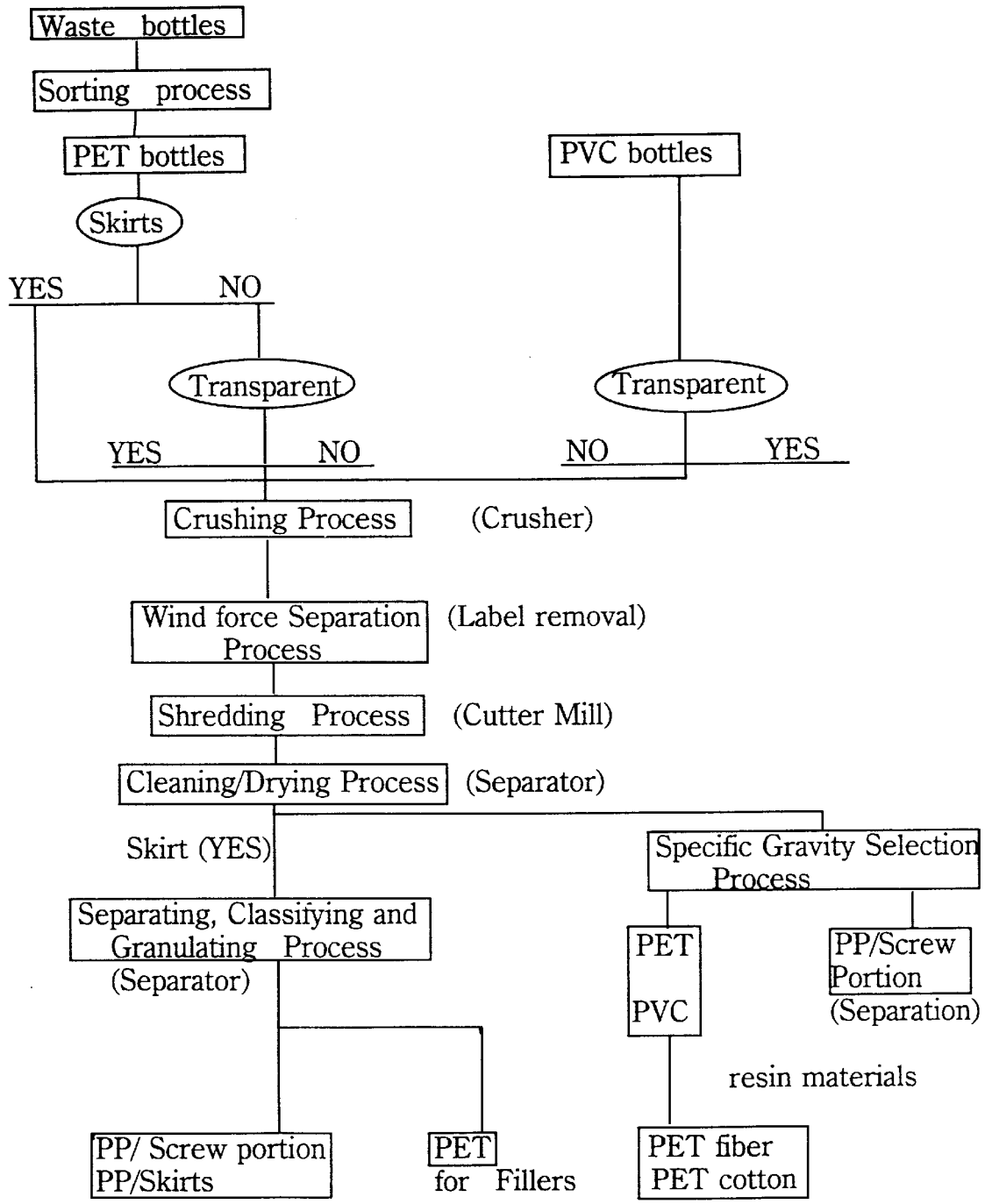
FIG. 2 is a systematic illustration of embodiment 2, showing a fundamental principle of the process of this invention for recycling and granulating the resin materials. The waste resinous containers processed by the method of this embodiment basically are the waste containers excluding those in embodiment 1, such as those with a cap, a screw portion, a main body, and a skirt, at least one of which is made of a different type of resin material, as well as those with labels.

The sorted bottles are shredded or in a broader sense crushed using the crusher 110 as shown in FIG. 2 into pieces of, for embodiment, 15 mm×50 mm (coarsely crushed pieces 81).

Shredding Process

The coarsely crushed pieces 81 obtained by the above crushing process are further shredded smaller, if required, as shown in FIG. 5, using a cutter mill 120 as a shredding means into small pieces to be treated 82: long squares of 2 mm×15 mm, squares of 10 mm×10 mm, or unspecified shapes of 10 mm or smaller.

Cleaning/Separation/Classification/Granulation

Using separator 130 as shown in FIGS. 7 and 8, an impact-grinding force is applied to the coarsely crushed pieces 81 in the Crushing process or small pieces to be treated 82 (as required in the Shredding process) to separate and remove foreign objects; to crush, clean, and granulate them; and to polish, size-regulate, and collect the granules. Functions of each process is the same as explained above embodiment for treatment of PE bottles.

The separator 130 used in the present embodiment has a screen 151 having mesh of 0.6 through 0.8 mm in diameter, conditions of the centrifuge were 900 through 1200 rpm and around 10 through 12 minutes per batch; thus the coarsely crushed pieces 81 or small pieces to be treated 82 were crushed, granulated and size-regulated, and polished into granules of unspecified shapes having a size of around 1 through 3 mm. PET bottles were processed for a longer time with a lower rotation speed to separate the oily foreign object from the coarsely crushed pieces 81 or small pieces to be treated 82. PET bottles does not naturally form spheres as in the case of PE when an impact-grinding force is applied. The residual salad oil in the recycled PET resin was no more than 0.1 percent by weight.

In the embodiments above, PE and PET bottles were taken up as major resin materials for bottles, while other resin materials such as polycarbonate and poly(vinyl chloride) can also be recycled as granulated resin materials.

Also in the embodiments above, salad oil was taken up as a residual foreign object, while other oils such as tem-pura oil and sesame oil can also be treated in the same way. Foreign objects other than oils include viscous fluids such as Worcester sauce, dressing, and mirin; various products such as beverages, shampoo, detergents, eye lotion, vinegar, soy sauce, sake, and beer; and the waste containers for these products can more easily be recycled as granules the residual contents of which are separated and removed; the process can be more easily carried out than in the case of oily products which already have been proved to be separable and removable from the waste containers. Further, other foreign objects such as mud, soil, sand, and dirt can also be easily separated and removed by the method of the present invention.

Grinding and impact forces (especially the latter) combined with a centrifugal force push out the foreign objects in the following order: air, water, lower viscosity fluids, higher viscosity fluids, solid wastes such as mud and soil, oily foreign objects (highly viscous fluids), and coarsely crushed pieces or small pieces to be treated. The difference in speed of pushing out easily cause the separation of the foreign objects.

FIG. 2 is a systematic illustration of a process for the waste bottles other than the object of FIG. 1. However, FIG. 2 becomes FIG. 1 with some unnecessary steps omitted; thus FIG. 2 can be a systematic illustration of all the processes including FIG. 1. In the mode of embodying the present invention, it is preferable to use an optimized conditions and an optimized combination of processes according to the types of residual content and resin.

Referring to FIG. 2, the object waste container is a bottle with other accessories such as a cap, a screw portion, and a skirt, at least one of which is made of a resin material different from that of the main body; and also a bottle with a label; thus a PET bottle for a carbonated beverage is taken up as an example.

This PET bottle has accessories such as a skirt, a screw portion to tighten the cap, and a label which are made of other types of resin such as PP and PE. According to the present invention, this bottle can be processed without removing these accessories. The bottle is adhered or contaminated with the residual content, mud, soil, sand, and dirt.

A method to recycle resin materials such as PET, PP, and PVC is explained below.

As shown in FIG. 2, the metal cap is removed from the bottle consisting of a cap screw portion, the main body, and a label, and the residual content is discarded. Then, the bottle goes through a series of processes comprising sorting, crushing, window-force classification, shredding, cleaning/drying, separation/classification/granulation; and/or specific-gravity selection; as well as dehydration as required.

Sorting Process

This process is the same as in FIG. 1, which was explained earlier. The bottles are sorted into those made of various types of resin material such as PET and PVC (only PET and PVC are described in FIG. 2, while the scope of this embodiment is not confined to these resin materials only), transparent and colored bottles, and bottles with or without skirts. Colored bottles should preferably be further sorted into different colors.

The screw portion and/or the skirt (the latter includes a part of the main body) can be cut off the main body of the bottle (hereinafter called a "bottle main body") to be processed independently.

Normally, various parts of PVC bottles, including the screw portion for the cap, are made of a single resin material. Also, since the PVC bottles are not used for carbonated beverages, they do not have skirts. Most bottles have screw portions. For an efficient processing, the bottles should be sorted into different types of resin materials first, then into transparent and colored. Further, in the case of PET bottles, they are only sorted into bottles with and without skirts.

Crushing Process

The waste bottles are crushed or shredded by means of a crushing means 110 into coarsely crushed pieces 81 of 15 mm×50 mm as shown in FIG. 3.

The crushing means used is the crusher 110, which is the same as the crusher 110 in FIG. 3 which was used in the embodiment associated with FIG. 1. At this point, the coarsely crushed pieces 81 was black affected by the color of the foreign object.

As shown in FIG. 4, the crushing means used had two crushers, upper and lower. Crusher 210a has a horizontal axis and crusher 210b has an axis inclined by 45 degrees, which greatly increases the processing capacity and minimizes the processing time.

It is preferable to place a grinder 211 under the housing of crusher 110; i.e., the grinder 211 easily grinds the shredded waste container into coarsely crushed pieces 81, and facilitates to remove small stones and sand in the bottles. A net conveyor 212 having a band net inclined by approximately 45 degrees is placed under the grinder 211 to screen off small stones and sand contained in the coarsely crushed pieces 81. More preferably, a magnetic selector 213 is placed under the tip of the moving net conveyor 212 to sort metal caps and rusted iron pieces contained in the coarsely crushed pieces 81. Further, the coarsely crushed pieces 81 free of metal and iron rust passes through a rotary screen 215 to separate foreign matters such as minute stones, sand, and metal powders.

Wind-force Separation Process

This process is to separate printed labels from the coarsely crushed pieces. The crushed polystyrene labels printed on its surface, which had been wrapped around PET bottles, are sucked by a blower 33 equipped with a cyclone 31. A sucking wind-force selector 30 capable of treating 200 through 500 kg/h of resin materials is used to suck the printed labels crushed in the previous process to separate them from the coarsely crushed pieces 81 of the crushed main body of container (FIG. 3).

Shredding Process

The coarsely crushed pieces 81, composed of the crushed main body of bottles from which labels have been separated, are further shredded into small pieces to be treated 82, for example, long squares of 2 mm×15 mm; squares of 10 mm×10 mm; or into unspecified shapes of a size not larger than 10 mm. At this point, the foreign object still remains on the surfaces of small pieces to be treated 82.

The shredding means is to shred the coarsely crushed pieces 81 into small pieces to be treated 82, and is called a "cutter mill" for convenience in the present embodiment.

FIG. 7 shows an embodiment of a cutter mill 120.

The main body 121 of the cutter mill is a cylindrical casing having an opening on the top. The opening is covered with a lid 122, which can be freely opened and closed. The lid 122 has an inlet port 123 to feed the coarsely crushed pieces 81 into the main body 121 of the cutter mill.

Inside the main body 121 of the cutter mill, a cutter-supporter 124 is placed, which is supported on the bottom of the main body 121 of the cutter mill and is rotated horizontally by means of an unillustrated driving means; the cutter supporter 124 has three vertically long rotary blades 125 on its circumference; the three rotary blades 125 are placed on the cutter supporter 124 so as to make the same angle, 120 degrees, against the rotating direction; and the tips of the three rotary blades 125 are positioned on the same rotating locus. Against the three rotary blades 125, two fixed blades 126 are placed on the interior wall of the main body of the cutter mill at a symmetrical positions of the loci of and a small clearance from the rotary blades 125. Further, the two fixed blades 126, the cutter-supporter 124, and the rotary blades 125 divide the main body of the cutter mill into two parts, forming the feeding chamber 127 and the shredding chamber 128. The inlet port 123 with the lid 122 communicates with the feeding chamber 127. The clearance between the two fixed blades 126 and the rotary blades 125 can be adjusted freely to shred the object material into a specified size. The clearance used in this embodiment is 0.2 through 0.3 mm. The mesh screen 129 divides the shredding chamber 128 between the two fixed blades 126 and to surround the locus of the rotary blades 125. The screen 129 is a mesh, through which the small pieces to be treated 82 of approximately 10 mm can pass. There is provided a discharge port to discharge the small pieces to be treated 82 at the bottom of the main body 121 of the shredding chamber 128.

The coarsely crushed pieces 81, crushed by the crusher 110 in the crushing process of process 1 and having a size of approximately 15 mm×50 mm are fed through the inlet port 123 with a lid 122 of the cutter mill 120; the coarsely crushed pieces 81 is shredded between the rotary blades 125 on the cutter-supporter 124 and the fixed blades 126 by rotating the cutter-supporter 124 by means of an unillustrated driving means; most of the shredded resin pieces go through the screen 129 to give small pieces to be treated 82 having shapes of long squares of approximately 2×15 mm, squares of approximately 10×10 mm, or unspecified shapes not larger than 10 mm in a side length; and the small pieces to be treated 82 go out of the discharge port to be transferred to the next process.

The shredding means is not confined to the cutter mill mentioned above; e.g., "Hard-crusher" manufactured by Horai, Ltd. can also be used wherein the rotary axis for the rotary blades 125 is horizontal, and the screen 129 between the two fixed blades is at the bottom. At this point, the surface of the first-coarsely crushed pieces 81 are opaque and light-black with foreign matters on the surface partly removed.

Preferably, before or after the Wind force separation process or the above Shredding process, crushed pieces of resin materials may be dried in a known drier having a screen in order to classify or separate rain water, dew, mud, soil, sand, and dirt adhering thereto before the following Cleaning and drying process.

Cleaning and Drying Process

Foreign matters 84 such as mud, soil, sand, metals, pieces of glass, dirt are removed from the surfaces of the shredded small pieces to be treated 82 in the above shredding process, which are squares or of unspecified shapes of approximately 10 mm in a side length, by an impact-grinding force; then the small pieces to be treated are cleaned and dried by the friction heat generated by the impact-grinding force on the small pieces to be treated. The small pieces to be treated 82 are processed at 800 through 900 rpm for approximately 5 minutes.

When the whole bottle is made of PVC including a screw portion, and when the bottle is made of PET without a skirt, the following separation, classification, and granulation processes can be carried out in succession for recovering PET or PVC.

Separation/Classification/Granulation Process

These processes typically are to process a bottle after cutting off a skirt from the main body, or to process the main body of a bottle together with a skirt; i.e., an impact-grinding force is applied to small pieces to be treated 82 to crush them into smaller pieces of unspecified shapes, 1 through 2 mm in a side length, after the cleaning/drying process; PP constituting the skirt is separated from the small pieces to be treated 82, polished, and granulated and size-regulated. At the same time, PET constituting the main body of a bottle is pulverized and separated by applying an impact-grinding force, the mixture is classified, and PP of the skirt is recycled as resin materials.

PET is used for fillers such as an aggregate for construction works, and PP is used for various molded goods. The process is carried out at 1500 through 1800 rpm and in approximately 3 through 4 minutes.

The 2nd process mentioned above can be repeated as required.

Cleaning/drying and separation/classification/granulation are the processes which can be carried out in a single device. The small pieces to be treated 82 of the main body are cleaned, dried, crushed, polished, and granulated and size-regulated. PET is further crushed into a fine powder, and PP is separated from the main body, classified, and granulated and size-regulated. In this embodiment, separator 130 shown in FIGS. 7 and 8 was combined with the cleaning/drying means. The separator 130 was explained referring to the illustration associated with FIG. 1; accordingly, the explanation is simplified by limiting it to those required here.

PVC bottles should preferably be sorted into each ones those having different colors; and then by a rotation of an unillustrated horizontal rotary axis 142 rotates the mobile disk 141, the small pieces to be treated 82 are fed from the inlet port 132 to be crushed, polished, and granulated and size-regulated by the impact-grinding force generated between the fixed and the mobile pins at the center of the processing space 155. Thus the small pieces to be treated receive a centrifugal force together with the effects of polishing, granulating and impact-grinding force to approach the circumferential side. In the course of this process, PET from the main body of a bottle is crushed into pieces of unspecified shapes not larger than 1 mm; the foreign objects are removed from the discharge port 152, which will be explained later, by means of the first separator. A part of the crushed main body of bottles in the mixture passes through the screen 151 with a centrifugal force generated by the mobile pins 144, classified in the discharge space 156, and are sucked and discharged into outside from the discharge port 152 through the blower 157.

In the case of the main body of bottles with skirts, materials excluding foreign objects remain on the screen 151 as in the second separator, are taken out from the outlet port 153, and are fed to the second separator. The second separator processes, polishes, and granulates the materials into spheres of approximately 1 mm in diameter, or into rectangular or cylindrical shapes of approximately 2 through 5 mm in a side length, or into other shapes. In the course of this process, some resin materials in the small pieces to be treated 82 are partially pulverized into a fine powder of an unspecified shape.

During processing by the second separator, the polished and granulated resin material and a part of PP from the skirt remains on the screen 151, which are returned to the inlet port 132 together with the materials discharged from the outlet port 153, because the outlet port 153 and the inlet port 132 being communicated together through the opened plug valve 154, and then the crushed resin material of the main body is pulverized to pass the screen 151 and is discharged through the discharge port 152. Most part, however, of the granulated resin material, which has not been sufficiently polished and granulated and size-regulated into fine granules, remains on the screen 151.

Granules of PP as granulated resin materials are taken out through the outlet port 153 with the plug valve open. The same device as in the embodiment associated with FIG. 1 is also applied to take out granulated PP resin in this embodiment.

Colors of the recycled resin materials were affected by those of the respective parts of bottles; i.e., PP from the skirt had a color of the skirt, and PET from the main body of bottles had colors of the main body; or was almost transparent, translucent and colorless, light-white, or was light-yellow in case transparent waste bottles are treated.

As an example, experimental separators 130 having a structure mentioned earlier was used; 600 g of the small pieces to be treated 82 were fed to the first separator; the mobile disk 141 was rotated at 900 rpm; thus PET and some PP could be separated, and PP could be recovered from the second separator after a processing for 3 minutes at 1800 rpm.

Specific-gravity Selection Process

This process is to obtain a higher-grade resin materials. When the material of a screw portion of the bottle (e.g., PP or PE) is different from that of the main body, specific-gravity selection of the screw portion resin in water is inserted instead of or after separation, classification, and granulation process, which follow the process for cleaning/drying in the second separator. Thus the screw portion resin is separated, and the resin material of the main body only can be recycled.

The mixture of resin materials after the cleaning/drying process is put into water; then light-weight PP becomes afloat and heavier PET or PVC precipitates. A liquid-cyclone separates PP from the other material, and the main resin material is recovered through a dehydration process.

Figure 10:
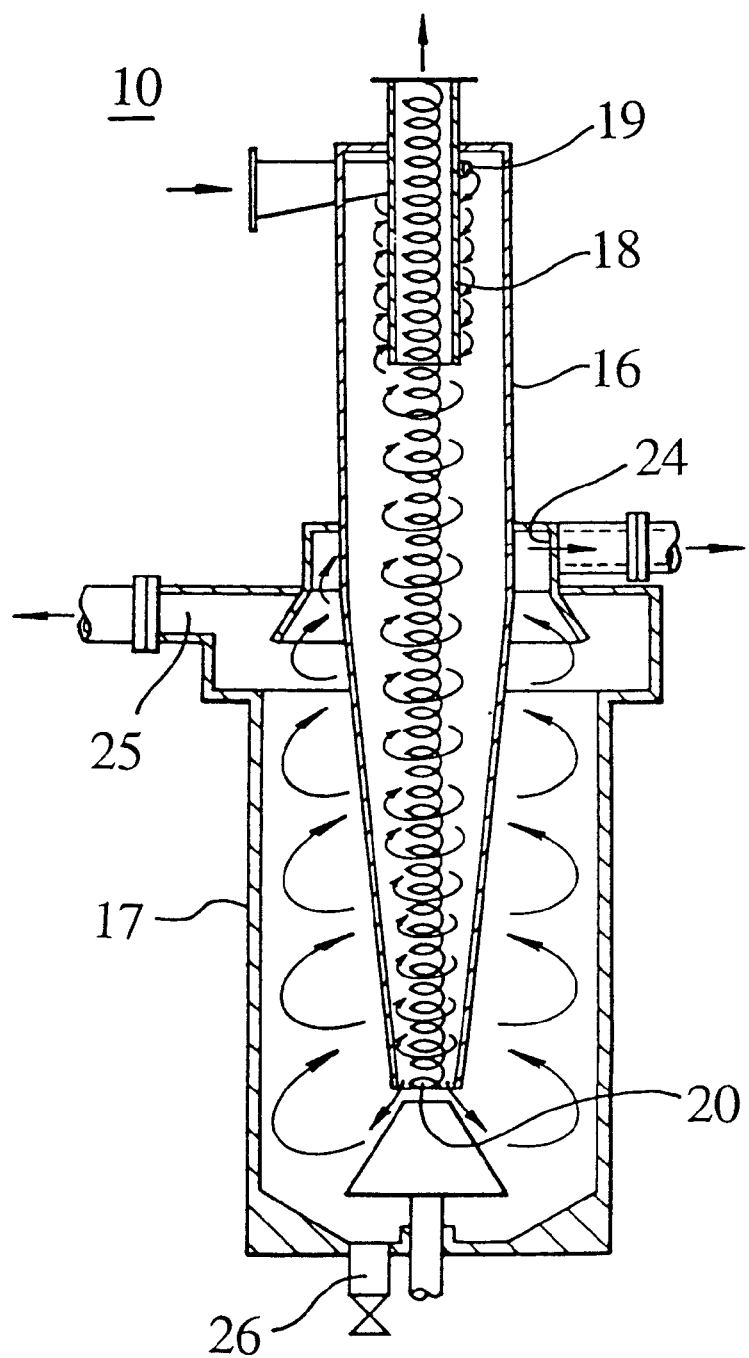
FIG. 10 is a whole view showing main parts of the device of this invention, separating materials by specific-gravity difference.

The liquid-cyclone 10, as an example shown in FIG. 10, feeds the material into the inlet port 19, where water (20 t/h) and a process fluid (150 kg/h) including resin materials after above process is pushed into the cyclone 10. The mixed fluid forms a whirl-stream flowing down along the wall of the upper cyclone 16. This whirl-stream collects large specific gravity PET or PVC at the circumferential wall, pushes it down, and transfers it to the lower cyclone 17 through the opening 20. PET or PVC moved to the upper part of the circumferential wall are taken out through the discharge port 25. The small specific gravity PP is collected at the center by another stream generated by the whirl-stream, and is taken out through the discharge pipe 18. Fluids are taken out through the outlet port 24, and the precipitates are taken out through the outlet port 26.

Explanations have been made for PET and PVC bottles only, while other granulated resin materials such as polyethylene and polycarbonate can be recovered in the same manner.

The processes of this invention sometimes can be reversed or omitted according to the conditions of the collected PET or PVC bottles including the extent of contamination, other than shredding and cleaning/drying processes.

The recycled granulated resin material of the present invention can be fed directly into an extruder to produce the products such as polyester fiber and polyester cotton or to produce pellets which are another form of resin materials. Also a virgin material of the same resin materials can be blended such as virgin PVC and recovered granulated and size-regulated PVC. Further, a synthetic wood board can be produced from the pellets blended with a dried wood powder in a extruder.

The present invention is so constituted as explained above, and has the effects described below.

By using a relatively simple and easy means, foreign objects were separated and removed from the object waste containers by applying a impact-grinding force; i.e., the resin material was efficiently and granulated and size-regulated into an appropriate range of grain size for reuse. Further, the resin materials constituting the container for oily products, which are the most difficult substances to be processed for recovering, could be efficiently recovered, and granulated and size-regulated into a required range of grain size for reuse, wherein combination of an impact-grinding force and a centrifugal force was applied, the combination having a synergetic effect which further facilitated separation and removal of oily foreign objects from the waste containers which was constituted with the same resin materials.

For the reason mentioned above, a large quantity of water and a large scale of facility, conventionally used for cleaning the waste containers, could be omitted; i.e., the present invention contributes to saving cost and resources.

In particular, the process of the present invention can eliminate the use of a cleaning chemical fluid to separate the foreign objects such as oily materials used with or without water, preventing the contamination of rivers with the cleaning drain and saving the cost for the facility and operation.

Thus, the broadest claims that follow are not directed to a machine that is configured in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interrupted as illustrative and not in a limiting sense. It is also to be understood that the following claims are intended to cover all of the generic and specific features of the invention herein described, and all statements of the scope of the invention which, as a matter of language, might be said to fall therebetween.

Now that the invention has been described;
What is claimed is:

1. A method for recovering resin material, the method comprising:
    a) crushing, into coarsely-crushed pieces, a waste container that is made of thermoplastic resin material and that has a plastic film wrapped around the container;
    b) forcing air through the coarsely-crushed pieces, to separate and remove the film from the coarsely-crushed pieces;
    c) applying an impact-grinding force to the coarsely-crushed pieces, to separate the resin material from foreign objects;
    d) granulating the resin material to form granulated resin material; and
    e) recovering the granulated resin material.

2. The method of claim 1, further comprising:
drying the coarsely-crushed pieces after the crushing step.

3. The method of claim 1, further comprising:
shredding the coarsely-crushed pieces to form shredded smaller pieces; and
from time to time, removing the foreign objects that have been separated from the resin material.

4. The method of claim 3, further comprising:
applying an impact force and a centrifugal force to the coarsely-crushed pieces, to separate the resin material from the foreign objects.

5. The method of claim 3, further comprising:
applying an impact force and a centrifugal force to the small pieces, to separate the resin material from the foreign objects.

6. The method of claim 3, wherein
A) the container includes a main body coupled with a skirt underneath; and
B) the method further comprises:
    i) applying an impact-grinding force to the shredded small pieces, to separate the resin material from the foreign objects;
    ii) cleaning and drying the resin material;
    iii) applying an impact-grinding force to pulverize and granulate the skirt, before the step of recovering the granulated resin material; and
    iv) separating and classifying the granulated resin materials of the main body of the container.

7. The method of claim 3, wherein:
A) the container includes a main body coupled with a flanged screw portion; and
B) the method further comprises:
    i) applying an impact-grinding force on the small pieces of the main body and screw portion, to separate the foreign objects;
    ii) granulating, regulating the size of, cleaning, and drying the resin materials;
    iii) separating resin material from the flanged screw portion and from the main body, based on differences in specific gravity, in water; and
    iv) recovering the resin material of the main body separately from the resin material of the flanged screw portion.

8. The method of claim 7, further comprising:
drying the crushed pieces of resin material after the shredding step.

* * * * *